US007440900B2

(12) United States Patent
Chang

(10) Patent No.: US 7,440,900 B2
(45) Date of Patent: Oct. 21, 2008

(54) VOICE MESSAGE PROCESSING SYSTEM AND METHOD

(75) Inventor: Eric I-Chao Chang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 671 days.

(21) Appl. No.: 10/099,606

(22) Filed: Mar. 15, 2002

(65) Prior Publication Data

US 2003/0177008 A1 Sep. 18, 2003

(51) Int. Cl.
*G10L 21/00* (2006.01)
(52) U.S. Cl. ...................................... 704/275
(58) Field of Classification Search .................. 704/275
See application file for complete search history.

(56) References Cited

U.S. PATENT DOCUMENTS

| 5,568,540 | A | | 10/1996 | Greco et al. ................. 379/89 |
| 5,751,793 | A | * | 5/1998 | Davies et al. ............ 379/88.11 |
| 6,651,042 | B1 | | 11/2003 | Field et al. .................. 704/270 |
| 6,778,644 | B1 | * | 8/2004 | Jenkins et al. ........... 379/88.18 |

FOREIGN PATENT DOCUMENTS

GB 2 364 850 A 6/2002

WO WO 01/16936 A1 8/2001

OTHER PUBLICATIONS

Emotion Detection From Speech to Enrich Multimedia Content By: Feng Yu et al., Microsoft Research China 2001.
Foldering Voicemail Messages by Caller Using Text Independent Speaker Recognition. By: Aaron E. Rosenberg et al., AT&T Labs-Research, Florham Park, NJ, Jan. 2001.
Recent Improvements in Voicemail Transcription By: M. Padmanabhan et al., IBM T.J. Watson Research Center, Yorktown Heights, NY, Jan. 2001.
Extractive Summarization of Voicemail Using Lexical and Prosodic Features Subset Selection By: Konstantinos Koumpis et al., Department of Computer Science, University of Sheffield, UK, Jan. 2001.
Automatic Transciption of Voicemail at AT& T By: Michiel Bacchiani, AT&T Labs-Research, Florham Park, NJ, Jan. 2001.
Scanmail: Audio Navigation in the Voicemail Domain By: Michiel Bacchiani et al., AT&T Labs-Research, Florham Park, NJ, Jan. 2001.

* cited by examiner

*Primary Examiner*—Susan McFadden
(74) *Attorney, Agent, or Firm*—Joseph R. Kelly; Westman, Champlin & Kelly, P.A.

(57) ABSTRACT

A voice message is processed in a distributed system by storing voice message data indicative of a plurality of voice messages on a distributed data store. A distributed data processor accesses the voice messages and extracts desired information from the voice messages. The data processor then augments the data stored in the voice message data store with the extracted information. The user interface component provides user access to the voice messages with the augmented data.

23 Claims, 5 Drawing Sheets

VOICE MESSAGE PROCESSING SYSTEM AND METHOD

BACKGROUND OF THE INVENTION

The present invention relates to speech processing. More specifically, the present invention relates to voice message processing for processing voice messages received by a distributed system.

Currently, many people receive a large number of different types of messages from a wide variety of sources. For example, it is not uncommon for persons to receive tens of voice mail messages over a weekend. Exacerbating this problem is the recent use of unified messaging. In a unified messaging system, messages from a wide variety of sources, such as voice messages, electronic mail messages, fax messages, and instant messages, can be accessed in a seamlessly united manner. However, compared to electronic mail messages and instant messaging systems, the type of information associated with voice messages is very limited.

For example, an electronic mail message typically includes the identity of the sender, a subject line, and an indication as to priority. Similarly, such messages can be fairly easily scanned, copied and pasted, since they are textual in nature. By contrast, voice mail messages typically do not have any indication of sender. In systems equipped with caller identification, the incoming number can be identified and a presumed sender can also be identified, if the incoming number is associated with a person. However, such systems only track a telephone, and not a speaker. Voice mail messages typically do not include an indication as to subject or priority, and are also difficult to scan, copy and paste, since they are vocal in nature, rather than written.

The lack of information associated with voice messages make them more time consuming to process. For example, it is possible to eliminate many electronic mail messages simply by skimming the subject line or the sender line, and deleting them immediately from the mail box if they are not desired, or organizing them into a desired folder. In fact, this can even be done automatically by specifying rules for deleting mail messages from certain users or having certain subjects.

Scanning voice mail messages, on the other hand, typically requires a much greater amount of time, because the user must listen to each message simply to extract the basic information such as the sender and subject. It is also virtually impossible, currently, to automatically create rules to preorganize voice mail messages (such as to organize them by sender, subject or urgency).

SUMMARY OF THE INVENTION

A voice message is processed in a distributed system by storing voice message data indicative of a plurality of voice messages on a distributed data store. A distributed data processor accesses the voice messages and extracts desired information from the voice messages. The data processor then augments the data stored in the voice message data store with the extracted information. The user interface component provides user access to the voice messages with the augmented data.

In one embodiment, the distributed voice data processor applies user selected rules to the data, such as sorting, generating alerts and alarms.

The voice data processor illustratively extracts a wide variety of information, such as speaker identity (using speaker identification models), speaker emotion, and speaking rate. The voice data processor can also normalize the messages to a desired speaking rate, selectable by the user.

In one embodiment, the voice data processor also includes a transcription component for transcribing and summarizing the messages, and performing some natural language processing (such as semantic parsing) on the voice messages.

The user input can provide the user with a wide range of user actuable inputs for manipulating the voice messages. Such inputs can include, for example, a rate changing input for speeding up or slowing down the voice messages, inputs to set rules, displays of the various information extracted from the voice message, and display of rules which have been selected or deselected by the user.

DETAILED DESCRIPTION OF ILLUSTRATIVE EMBODIMENTS

The present invention is implemented on a distributed processing system to extract desired information from voice messages. The present invention extracts the desired information and augments a voice data store containing the voice messages with the extracted information. A user interface is provided such that the voice messages can be easily manipulated given the augmented information that has been added to them. By distributed, the present description means a non-server based system, but a system under the control of the individual user, such as a desk top system, a personal digital assistant (PDA), a telephone, a laptop computer, etc. Therefore, when the present description discusses a distributed processor, for instance, the present description means a processor residing on a device which may be part of a network but which is under the personal control of the user, rather than on a server, for example.

Figure 1:
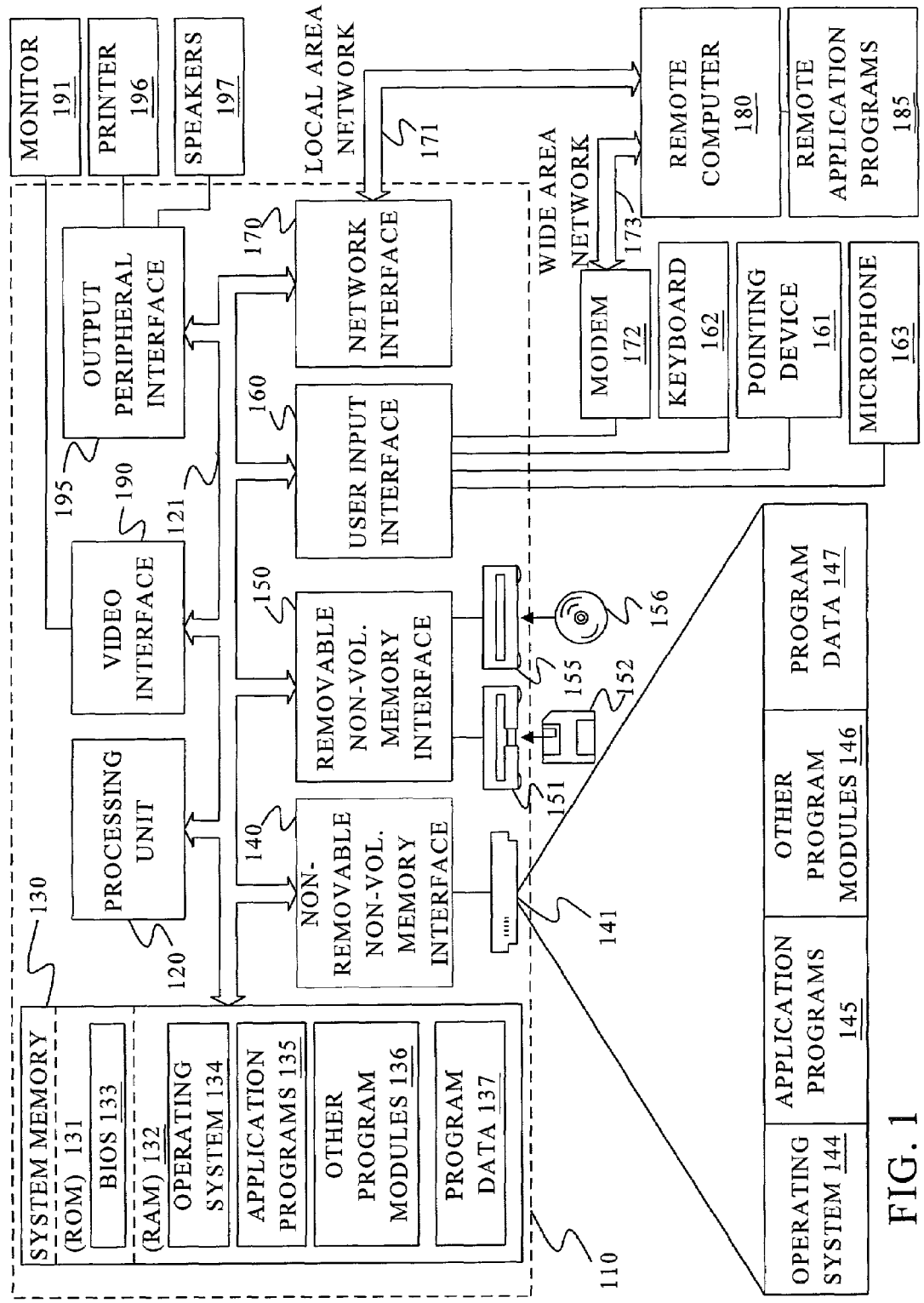
FIG. 1 is a block diagram of one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
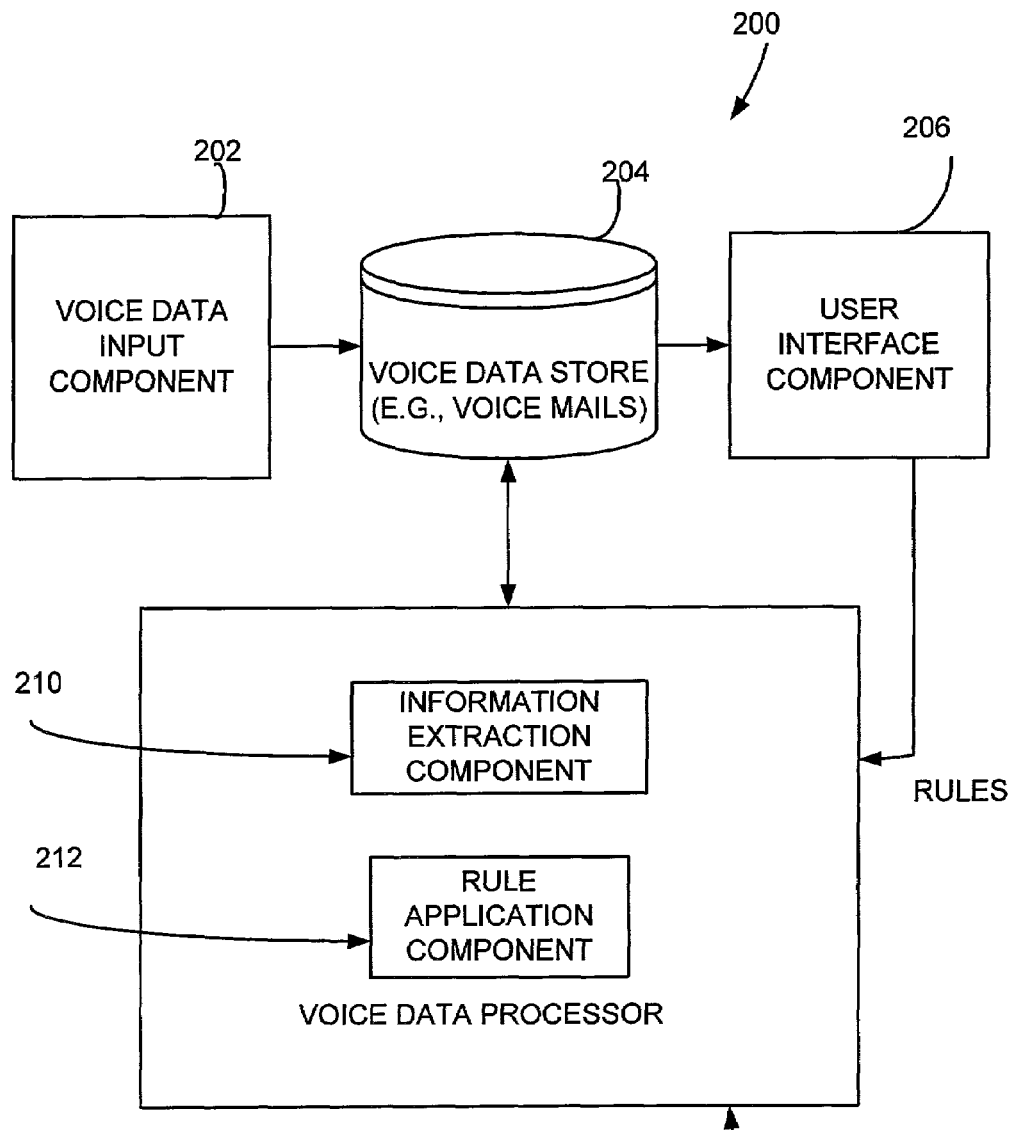
FIG. 2 is a more detailed block diagram showing a system in accordance with the present invention.

FIG. 2 is a more detailed block diagram of a voice message processing system 200 in accordance with one embodiment of the present invention. System 200 illustratively includes voice data input component 202, voice data store 204, user interface component 206, and voice data processor 208. Voice data input component 202 may illustratively include a telephone in cases where the voice data includes voice mail messages, a microphone where the voice data is recorded lectures or conversations, for example, and it can be other components, such as a radio, a compact disc player, etc.

Voice data store 204 is illustratively a portion of memory which stores the voice data, such as WAV files. User interface component 206 illustratively generates a user interface that can be invoked by the user to manipulate and organize the voice messages stored in voice data store 204. Voice data processor 208 illustratively includes information extraction component 210 that extracts useful information from the voice messages and rule application component 212 that applies user-selected rules to the voice messages.

Figure 3:
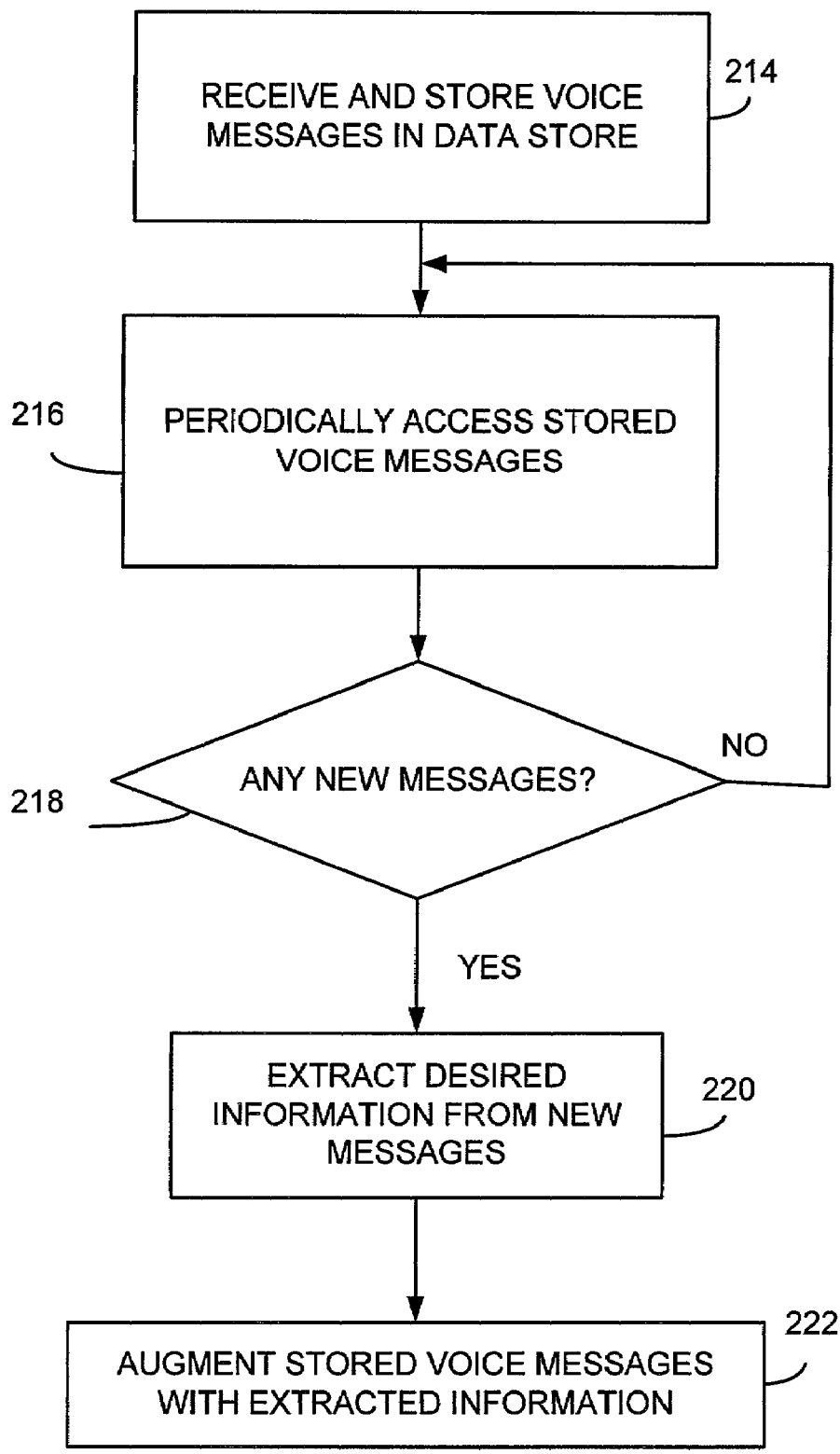
FIG. 3 is a flow diagram generally illustrating the operation of the system shown in FIG. 2.

FIG. 3 is a flow diagram that illustrates the general operation of system 200. Voice messages are first received from data input component 202 and stored in voice data store 204. This is indicated by block 214 in FIG. 3. Information extraction component 210 periodically, or intermittently, accesses data store 204 to determine whether any new voice messages have been stored in data store 204 since the last time it was accessed by information extraction component 210. This is indicated by blocks 216 and 218 in FIG. 3. If no new messages have been stored in voice data store 204 since the last time it was accessed by information extraction component 210, then processing simply reverts to block 216.

However, if, at block 218, information extraction component 210 comes upon new voice messages which have not been processed, then it subjects those new messages to voice data processing and extracts desired information from the new messages. This is indicated by block 220. Some examples of the desired information will be discussed in greater detail below, but it may illustratively be suited to enhance organization and manipulation of voice messages in data store 204 and to enhance application of rules to those messages.

In any case, once the desired information has been extracted from the new messages, the information (corresponding to the new messages) which is stored in voice data store 204 is augmented with the additional information which has just been extracted by information extraction component 210. This is indicated by block 222 in FIG. 3.

Figure 4:
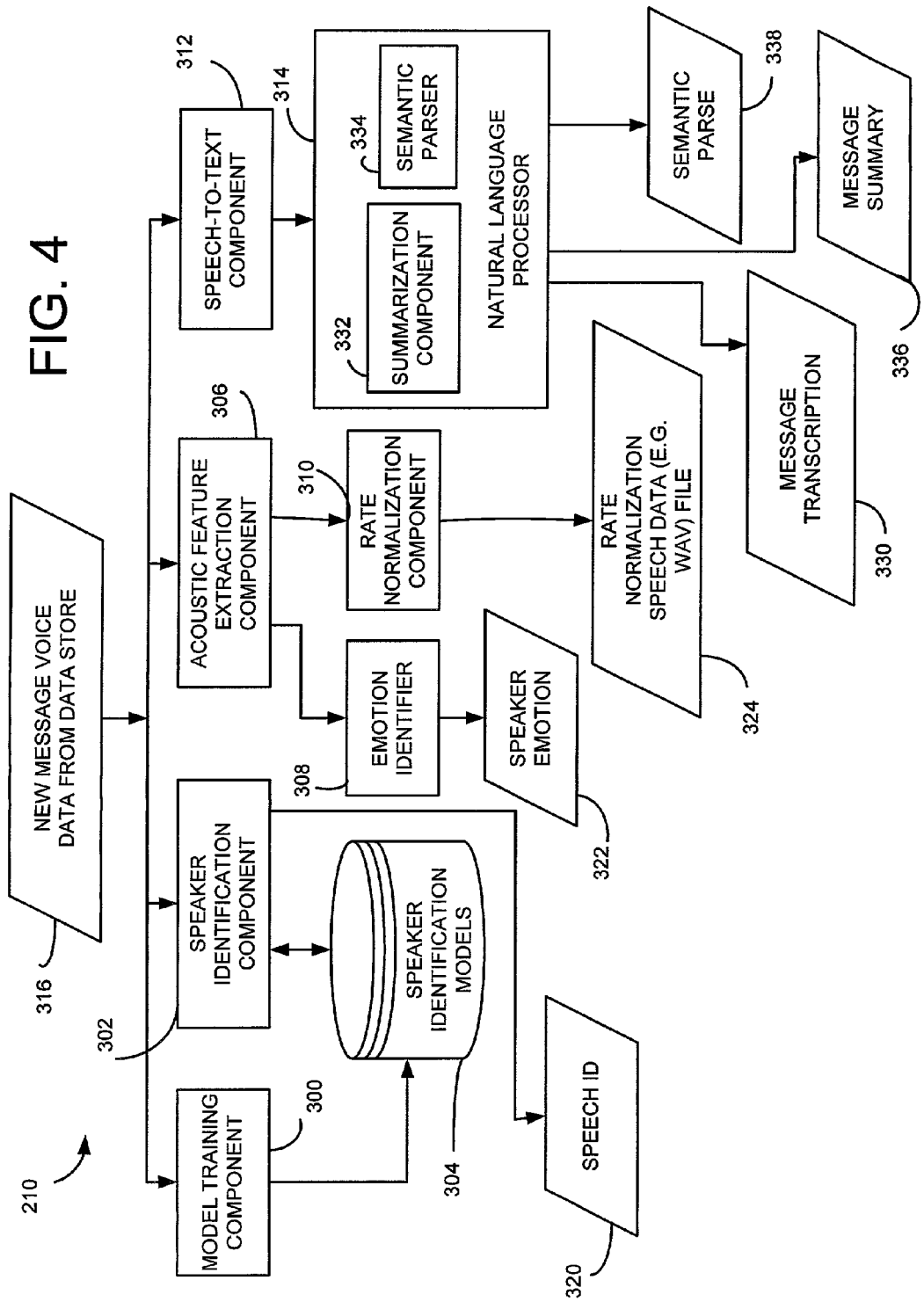
FIG. 4 is a more detailed block diagram of a voice data processing system in accordance with one embodiment of the present invention.

The type of information extracted from the voice mail messages can vary widely, as discussed above, but a number of types of information which can be extracted to enable a user to more efficiently process voice messages include the speaker's identity, the speaker's speaking rate, the speaker's emotional state, the content of the message, etc. FIG. 4 is a block diagram which illustrates one embodiment of information extraction component 210 for extracting these types of information. Of course, other information or different information can be extracted as well.

FIG. 4 illustrates that information extraction component 210 illustratively includes model training component 300, speaker identification component 302, speaker identification models 304, acoustic feature extraction component 306, emotion identifier 308, rate normalization component 310, speech-to-text component 312 and natural language processor 314. In one embodiment, the new message voice data 316 is obtained from voice data store 204. Data 316 is illustratively a WAV file, or other file, that represents a new voice message stored in data store 204, which has not yet been processed by information extraction component 210.

In one embodiment, data 316 is provided to speaker identification component 302. Component 302 accesses speaker models 304 and generates a speaker identification output (speaker ID) 320 indicative of an identity of the speaker. Speaker identification component 302 and models 304 can illustratively be any known speaker identification component and speaker identification models trained on specific speakers. Speaker identification output 320 can be a textual name of a speaker, an encoded identifier, or any identifier assigned by a user.

In the event that component 302 can not identify a speaker (for example, if models 304 do not contain a model associated with the speaker of the new message) component 302 illustratively provides speaker identification output 320 indicating that the identity of the speaker is unknown. In that instance, when the user reviews the new message and the speaker ID 320 is displayed as unknown, the user can illustratively actuate a user input on the user interface (discussed in greater detail below with respect to FIG. 5). This causes model training component 300 to obtain the WAV file (or other voice data) associated with the new message. Model training component 300 then trains a speaker identification model corresponding to this speaker and associates it with a speaker identification input by the user, or with a default speaker identification. Thus, the next time a voice message is processed from that speaker, speaker identification component 302 produces the accurate speaker ID 320 because it has a speaker identification model 304 associated with the speaker.

Model training component 300 can also refine models where the speaker identification component 302 has made a mistake. If the system makes a mistake, the user illustratively types the correct name in a window on a user interface and enters a user input command commanding model training component 300 to automatically train up a new speaker model 304 for that particular speaker. The user can also choose to update the models during use so that speaker identification becomes more accurate in the future, the more the system is used. Conversely, training component 300 can incrementally update speaker models 304 in an unsupervised fashion. For example, if the user accesses the new voice message, which displays the speaker identity, and the user does not change the user identity, then model training component 300 can access the voice data associated with that message and refine its model corresponding to that speaker.

Speaker identification component 302 can also provide, along with speaker ID 320, a confidence score indicating how confident it is with the recognized identity. Based on a user's confirmation of the system's decision, speaker identification component 302 can automatically update its parameters to improve performance over time.

In accordance with another embodiment of the present invention, information extraction component 310 includes the acoustic feature extraction component 306 for extracting desired acoustic information from voice data 316 to generate other data helpful to the user in manipulating the voice messages. For example, by extracting certain acoustic features, emotion identifier 308 can identify a predicted emotion of the speaker and output speaker emotion ID 322 indicative of that emotion.

Emotion identifier 308 can be any known emotion identifier, and can also be that described in the paper entitled EMOTION DETECTION FROM SPEECH TO ENRICH MULTIMEDIA CONTENT, by F. Yu et al., 2001. The system classifies emotions into general categories, such as anger, fear, and stress. By using such information, the system can easily classify the urgency of the message based on the sender and the emotional state of the sender.

In one illustrative embodiment, acoustic feature extraction component 306 extracts the pitch of the incoming speech and uses a plurality of derivatives of the pitch signal as basic features. Those features are then input into a support vector machine in emotion identifier 308 which categorizes each sentence as happy, sad, or angry. The support vector machines are each, illustratively, binary classifiers. Therefore, emotion identifier 308 can decide that multiple emotions exist in each sentence, with varying weights. This corresponds to the fact that multiple emotions can exist in a single sentence. Thus, speaker emotion identification output 322 can display all of those emotions, with corresponding weights, or it can simply display the strongest emotion, or any other combination of emotions.

In one embodiment, acoustic feature extraction component 306 also illustratively extracts a speaking rate of the message. This can be done using a number of different approaches. For example, acoustic feature extraction component 306 can take a Cepstral measurement to determine how fast the Cepstral pattern associated with the new voice message is changing. This provides an indication as to the rate of speech (in, for example, words per minute) for the new voice message.

In one embodiment, rate normalization component 310 is used. In accordance with that embodiment, the user can input a desired speaking rate (or can choose one from a pre-set list). Rate normalization component 310 then receives the speaking rate associated with the new voice message from acoustic feature extraction component 306 and normalizes the speaking rate for that message to the normalized rate selected by the user. Rate normalization component 310 then outputs a rate-normalized speech data file (e.g., a WAV file) normalized to the desired rate, as indicated by block 324. That file 324 is illustratively used at the user interface such that the voice message is spoken at the normalized rate when the user accesses the new message. Of course, the system can also retain the original message as well.

In one illustrative embodiment, in order to normalize the speaking rate, rate normalization component 310 evaluates the speaking rate of the new voice message and adjusts the speaking rate of each sentence with a known time scale modification algorithm. The system can also reduce the length of silence and pause intervals within the waveform for more efficient listening.

In accordance with another embodiment of the present invention, information extraction component 210 also includes a speech-to-text component 312. Component 312 illustratively includes a speech recognizer which reduces the voice data corresponding to the new message to a textual transcription that can be provided to optional natural language processor 314. Of course, speech-to-text component 312 can simply output the message transcription 330, which corresponds to the entire transcription of the new voice message indicated by data 316. However, where natural language processor 314 is provided, natural language processing can be applied to the transcription as well.

In one embodiment, natural language processor 314 includes summarization component 332 and semantic parser 334. Summarization component 332 is illustratively a known processing subsystem for summarizing a textual input. Summarization component 332 thus outputs a message summary 336 which corresponds to a short summary of the voice message.

In an embodiment in which semantic parser 334 is provided, the textual transcription generated by speech-to-text component 312 is illustratively input to semantic parser 334. Parser 334 then generates a semantic parse of the textual input to assign semantic labels to certain portions of the textual input and provide a semantic parse tree 338 at its output. One example of a semantic parse tree is an output that assigns semantic labels to portions of the voice message wherein the semantic labels correspond to various application schema implemented by the computing system on which the voice message resides, such that the voice message can be more readily adapted to that schema.

Once information extraction component 210 has generated all of these outputs, rule application component 212 (shown in FIG. 2) can execute user designated rules based on the voice data 316 and the extracted information (320, 322, 324, 330, 336 and 338) in order to enhance organization of the voice messages. For example, the user may select a rule that causes rule application component 212 to sort the voice messages by speaker, to filter them into different directories, to sort or filter the messages based on a subject (such as the message summary 336) or to sort by date. Rule application component 212 can also be employed to apply other rules, such as to alert the user based on certain attributes of the message, such as the speaker emotion 322, the speaker identity 320, or the message content (from message transcription 330, message summary 336 or semantic parse 338). Rule application component 212 can also be configured to delete messages from certain people or after a certain amount of time has elapsed since the message has been received. Rule application component 212 can also generate alarms based on predetermined criteria, such as the number of messages stored, the speaker identity 320, speaker emotion 322, etc. Of course, a wide variety of other rules can be applied by rule application component 212 as well.

Figure 5:
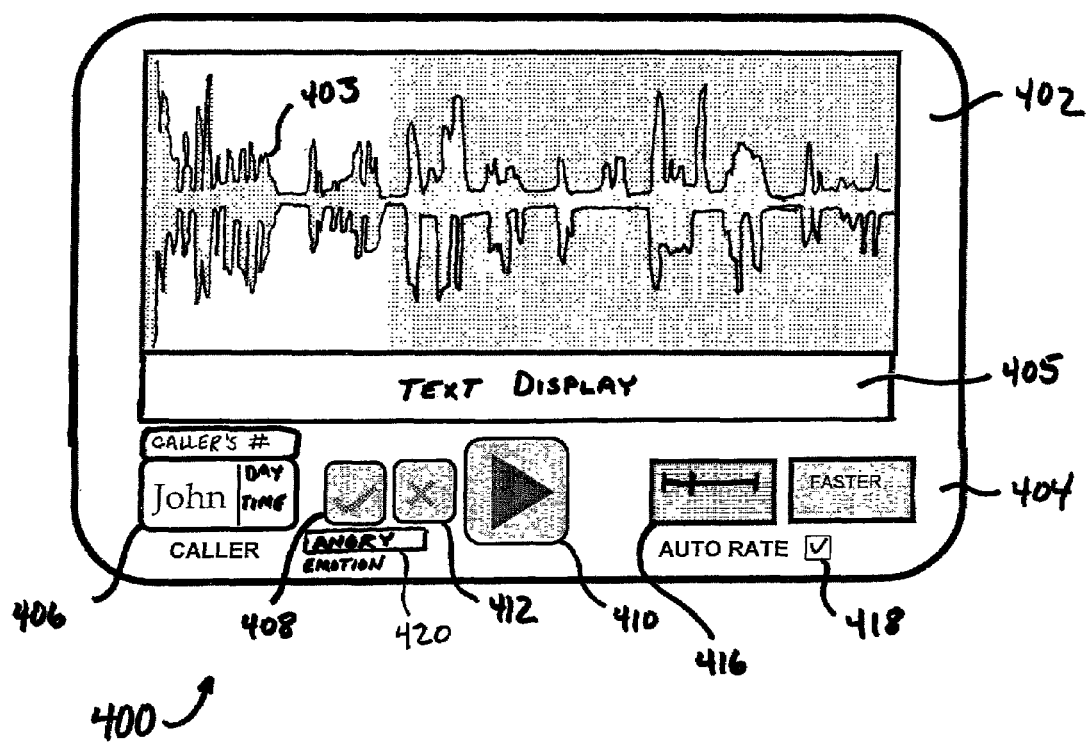
FIG. 5 is an illustration of one exemplary embodiment of a user interface in accordance with the present invention.

FIG. 5 is an illustration of one embodiment of a user interface in accordance with one example of the present invention. It will of course be appreciated that a wide variety of other user interfaces can be used, or the user interface can contain the same information as that shown in FIG. 5, but can be configured differently. FIG. 5 illustrates a user interface 400, which includes a display portion 402 and a tool bar portion 404. Display portion 402 is shown generating a display generally indicative of the WAV file 403, or acoustic representation of the voice message currently selected. Display portion 402 is also shown displaying the textual transcription 405, and could also show a textual summary or a combination of any of those or other items of information. Display portion 402 also illustratively includes a display portion 406 that displays the caller identity and day and time of the call along with the caller's telephone number.

Tool bar portion 404 also illustratively includes a variety of user actuable inputs which the user can actuate to manipulate or organize the voice messages. The inputs shown in FIG. 5 include, as examples, a delete input 408 for deleting the message, start and stop buttons 410 and 412, respectively, for starting and stopping a playback of the voice message. FIG. 5 also shows a faster/slower wiper 416 which allows the user to speed up or slow down the rate at which the voice message is played. Interface 400 in FIG. 5 can also include other user actuable inputs such as File and Print actuators used to store and print messages, and Get Message and New Message actuators used to retrieve old or new messages. Interface 400 also illustratively includes an autorate selector 418 which causes the message to be automatically normalized to a desired rate. Further, interface 400 illustratively includes emotion display 420 that displays the sensed emotion. Of course, the user interface can contain a wide variety of other user actuable inputs which allow the user to configure the user interface to display text, the acoustic information, the augmented information, and apply different rules etc.

It can thus be seen that the present invention provides a distributed processor for extracting desired information and augmenting a voice message data store with the desired information. The desired information illustratively is of a nature that helps the user to organize, sort and review or process voice messages.

Although the present invention has been described with reference to particular embodiments, workers skilled in the art will recognize that changes may be made in form and detail without departing from the spirit and scope of the invention.

What is claimed is:

1. A voice message processing system, comprising:
   a voice message (VM) data store storing voice message data indicative of a plurality of voice messages;
   a non-server based voice data processor, configured to be under personal control of a user during runtime voice data processing, coupled to the VM data store, configured to access the voice messages, extract desired information from the voice messages and augment the VM data stored in the VM data store with the desired information, the desired information including speaker identification information, acoustic information, voice message content, and speaking rate information, the augmented VM data comprising: speaker identity of the speaker of the voice message obtained by the voice data processor accessing a plurality of acoustic speaker identification models and obtaining the speaker identification based on the speaker identification information, speaker emotion based on the acoustic information, a voice message summary generated from the voice message content, and a speaking rate obtained from the speaking rate information;
   a user interface component coupled to the VM data store and configured to provide user access to the augmented VM data, the user interface component providing a display that displays the speaker identity obtained from the speaker identification models, the speaker emotion, the voice message summary, and an adjustment user interface element that is actuable to adjust the speaking rate of playback of the voice message; and
   wherein the voice data processor comprises a rate normalization component configured to receive the speaking rate information and normalize an associated voice message to a preselected speaking rate.

2. The system of claim 1 wherein the voice data processor comprises:
   a rule application component configured to receive user rule inputs indicative of user-selected rules and to apply the user-selected rules to the augmented VM data.

3. The system of claim 2 wherein the voice data processor comprises:
   a speaker identification model data store storing the plurality of speaker identification models; and
   a speaker identification component configured to access the speaker identification models data store and provide the identity of the speaker associated with the voice message corresponding to the VM data.

4. The system of claim 3 wherein the voice data processor comprises:
   a speaker model training component configured to receive VM data and train a speaker identification model based on the VM data and a user input indicative of a speaker of a voice message corresponding to the VM data.

5. The system of claim 2 wherein the voice data processor comprises:
   an acoustic feature extractor extracting the acoustic information as acoustic features from the VM data, the acoustic features being indicative of the desired information.

6. The system of claim 5 wherein the acoustic feature extractor is configured to extract features indicative of the speaker emotion and provide an emotion output indicative of the speaker's emotion.

7. The system of claim 5 wherein the acoustic feature extractor is configured to extract features indicative of the speaking rate and provide a rate output indicative of the speaking rate.

8. The system of claim 2 wherein the voice data processor comprises:
   a speech-to-text component configured to generate a textual output indicative of a content of a voice message.

9. The system of claim 8 wherein the speech-to-text component is configured to generate a transcription of the voice message as the textual output.

10. The system of claim 8 wherein the voice data processor comprises:
    a summarization component configured to generate the voice mail summary of the voice message.

11. The system of claim 8 wherein the voice data processor comprises:
    a semantic parser configured to generate a semantic parse of at least a portion of the voice message.

12. The system of claim 2 wherein the rule application component sorts voice messages based on the desired information.

13. The system of claim 2 wherein the rule application component generates alarms based on the desired information.

14. The system of claim 2 wherein the user interface component generates a user interface exposing user-selectable inputs for manipulation of the voice message by the user.

15. The system of claim 14 wherein the user interface displays a textual indication of a content of a voice message.

16. The system of claim 14 wherein the user interface displays a rule indicator indicative of rules being applied.

17. A method of processing voice messages, comprising:
    storing the voice messages at a non-server based voice message (VM) data store;
    intermittently accessing the VM data store during runtime to determine whether a new voice message has been stored;
    for each new voice message, processing the new voice message at a non-server based processor, during runtime, wherein processing includes extracting acoustic features from the new voice message and accessing acoustic speaker identification models to obtain speaker identity identifying a speaker of the new voice message, the extracted data further comprising acoustic features indicative of other desired information, and a textual representation of a content of the new voice message;

augmenting data in the VM data store with the extracted data; and adjusting a speaking rate of the new voice message to a selected speaking rate for playback.

18. The method of claim 17 wherein processing the new voice message to obtain acoustic features comprises:

obtaining acoustic features indicative of an emotion of a speaker of the new voice message and generating a speaker emotion output indicative of the speaker's emotion.

19. The method of claim 17 wherein the acoustic features include a speaking rate indicator indicative of a speaking rate of the speaker of the new voice message, and further comprising:

providing an interface to enable a user to adjust the selected speaking rate for playback of the new voice message.

20. The method of claim 17 wherein obtaining speaker identity includes providing an unknown output when speaker identity is determined to be unknown and further comprising:

receiving a user input indicative of a speaker identity for the new voice message; and training a speaker identification model based on the new voice message and the user input.

21. The method of claim 17 and further comprising:

receiving a rules input indicative of user-selected rules to be applied to the new voice message; and applying the user-selected rules based on the extracted data.

22. The method of claim 17 and further comprising:

semantically parsing the textual representation of the new voice message.

23. The method of claim 17 and further comprising:

generating a user interface to the VM data store, the user interface including user-actuable inputs for manipulating the voice messages in the VM data store.

\* \* \* \* \*